Mar. 13, 1923.
S. T. BRIZENDINE.
RESILIENT WHEEL.
FILED MAY 29, 1922.
1,448,107.
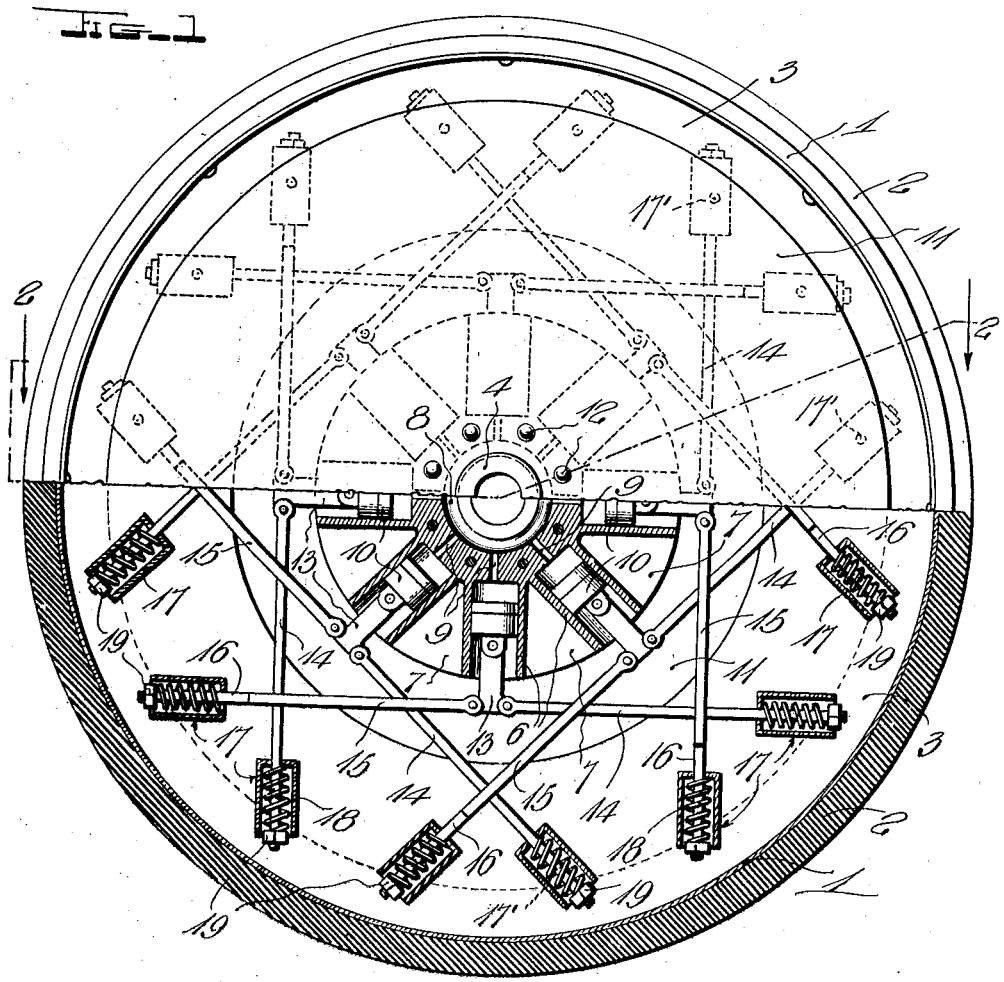
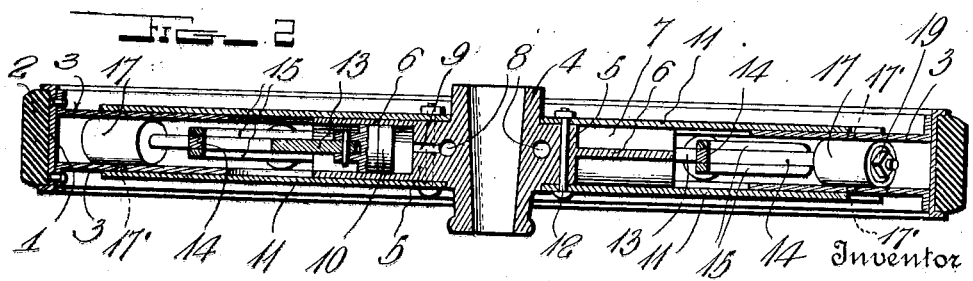
Witness
Inventor
S. T. Brizendine
By H. O. Wilson & Co.
Attorneys Patented Mar. 13, 1923.

1,448,107

UNITED STATES PATENT OFFICE.

SAMUEL T. BRIZENDINE, OF KANSAS CITY, MISSOURI.

RESILIENT WHEEL.

Application filed May 29, 1922. Serial No. 564,564.

*To all whom it may concern:*

Be it known that I, SAMUEL T. BRIZENDINE, a citizen of the United States, residing at Kansas City, in the county of Jackson and State of Missouri, have invented certain new and useful Improvement in Resilient Wheels, of which the following is a specification, reference being had therein to the accompanying drawing.

This invention relates to an improved resilient wheel and one object of the invention is to provide a wheel having an improved hub construction and improved means for yieldably holding the rim portion against movement towards the hub thereby permitting the wheel to absorb shocks received when going over rough roads and making it unnecessary to provide an inflated tire.

Another object of the invention is to provide improved spoke elements which are yieldably held against longitudinal movement and are connected with piston elements slidably mounted in cylinders carried by and extending radially of the hub portion of the wheel.

Another object of the invention is to so construct the hub portion that it may include cylinder elements to receive the pistons connected with the spoke elements and to provide the hub with a circumferentially extending pocket having communication with the cylinders and adapted to contain air, oil or any other suitable fluid which will be acted upon when the piston moves inwardly.

Another object of the invention is to provide a resilient wheel which will be strong and durable and noiseless in its operation and further braced against side strain which might tend to break the wheel or twist it out of shape.

This invention is illustrated in the accompanying drawing, wherein:

Figure 1 is a view showing the improved wheel partially in side elevation and partially in vertical section.

Figure 2 is a transverse sectional view taken along the line 2—2 of Fig. 1.

This improved wheel is provided with a rim 1 which carries the tire 2. This tire shown is of a solid construction and may be formed of any suitable material desired. The rim 1 carries spaced disks 3 which are open at their centers and form side plates for the rim portion of the wheel.

The hub 4 is thickened intermediate its length to provide an outstanding annular shoulder portion 5 having cylinders 6 extending radially therefrom and braced by webs 7 positioned between the cylinders. A pocket 8 is formed in the shoulder 5 circumferentially of the hub and is provided with ports 9 which extend radially of the hub and communicate with the inner ends of the cylinders 6. It will thus be seen that when the wheel is in use and the pistons 10 are successively moved inwardly, the air, oil or other fluid in the pockets 8, ports 9 and inner end portions of the cylinders will be acted upon and moved or compressed to serve as shock absorbing means and as means for resisting inward movement of certain of the pistons and as means for causing other pistons to have outward movement. Disks 11 are secured upon the end portions of the hub and against the side of the shoulder 5 by bolts 12 which extend through the shoulder and disks. These disks 11 overlap the disks 3 and will therefore serve to close the center openings of the disks 3 and further the disks 3 and 11 will serve to prevent the hub and rim from having movement transversely of the wheels but at the same time permit the rim to have movement towards and away from the hub.

In order to yieldably hold the rim against movement towards and away from the hub, each of the pistons 10 has been provided with a piston rod or plunger 13 which is pivotally connected with the piston for pivotal movement circumferentially of the wheel. Each of these piston rods is provided at its outer end with side ears one of which has pivotally connected therewith a spoke element 14 in the form of a single rod and the other of which has pivotally connected therewith the spaces forks 15 of a spoke element 16. From an inspection of Fig. 1, it will be readily seen that when the hub is positioned in the center of the rim, the spoke elements 14 and 16 extend at right angles to the piston rods which will extend radially of the hub and it will be further seen that each of the spoke-forming rods 14 extends between the spaced forks 15 of the spoke-forming element 16 which extends from other piston rods. The spoke elements will therefore be permitted of swinging movement which will permit the rim to move towards and away from the hub but the spoke elements will serve to brace each other against side play. The spoke elements 14 and the shank portions of the spoke elements 16 extend into cups 17 which by means of pins 17' are pivotally mounted between the plates or disks 3 adjacent the rim 1. Springs 18 are placed about the end portions of the spoke elements within the cups and are engaged by the securing nuts 19. It will thus be seen that these securing nuts serve to compress the springs and place them under the desired tension. With the securing nuts properly adjusted, the springs will serve to yieldably hold the spoke elements against longitudinal movement and in the normal position shown in Fig. 1 but will permit the spoke elements to have limited longitudinal movement to permit the spokes to assume the proper position when the wheel is in use and the pistons are moved in the cylinders during rotation of the wheel. When the wheel is in use, the weight of the automobile or other vehicle and shocks received while going over rough roads will cause the pistons to have movement longitudinally of the cylinders against the action of the springs and against the action of the fluid in the cylinders and pocket 8. The shocks will therefore be absorbed by the springs and fluid and the automobile or other vehicle will ride very easily.

I claim:

1. A resilient wheel comprising a hub including radiating cylinders, a rim portion, pistons in said cylinders having piston rods extending through the outer ends of said cylinders, and spoke elements pivotally connected with said piston rods and normally extending at right angles thereto, the outer end portions of said spoke elements being pivotally and slidably connected with said rim portion.

2. The structure of claim 1 having certain of the spoke elements in the form of forks having spaced arms pivotally connected with the piston rods, the remaining spoke elements being in the form of bars pivotally connected with said piston rods and extending between the fork arms of certain of the first mentioned spoke elements and cause the spoke elements to brace each other against side play.

3. The structure of claims 1 having the outer end portions of the spoke elements extending into spring carriers pivotally connected with the rim portion, springs in the spring carriers about the spoke elements, and securing nuts upon the spoke elements engaging said springs to place the springs under tension.

In testimony whereof I hereunto affix my signature.

SAMUEL T. BRIZENDINE.